March 27, 1951     A. F. LUNARDI     2,546,514
HOT CHOCOLATE DISPENSER

Filed Jan. 3, 1949

INVENTOR.
Alexander F. Lunardi
BY
Philip A. Gredell
Attorney

Patented Mar. 27, 1951

2,546,514

UNITED STATES PATENT OFFICE 2,546,514

HOT CHOCOLATE DISPENSER

Alexander F. Lunardi, Oakland, Calif.

Application January 3, 1949, Serial No. 68,789

7 Claims. (Cl. 210—52.5)

1

This invention relates to improvements in dispensers for hot chocolate or cocoa and provides a new type of dispenser which retains the sediment and the scum so that a clear drink is provided which will leave no settlings in the cup and will keep the walls of the cup clean and free of scum.

In the conventional methods of preparing and dispensing hot chocolate or cocoa, a prepared chocolate or cocoa is added to and stirred into hot milk, usually directly in the cup. In some cases, the chocolate or cocoa includes dried milk, in which case it is stirred into hot water only. In either case, a scum forms on the top of the drink, and sediment settles to the bottom of the cup, both of which depreciate the aesthetic qualities of the drink, and leaving the cup dirty appearing after the drink has been consumed.

With my invention, the hot chocolate or cocoa is prepared with the standard ingredients, using ordinary chocolate or cocoa, adding the correct amounts of sugar, salt, flavoring, and milk, and heating to the proper temperature with constant stirring, and then transferring the prepared drink to my dispenser, where the insoluble portions settle in a special settling chamber which also functions as a skimmer to prevent any scum entering the dispensing chamber, thus delivering the drink free of sedimentary matter and free of scum, so that when the drink is consumed, the cup will be clean. The drink, when served, is appetizing in appearance, free of scum, and does not cause creepage of chocolate up the sides of whipped cream which is deposited on top of the drink, since this creepage is effected only by scum.

Furthermore, with the sedimentary matter and scum removed, the drink will keep for a greater length of time, making it possible to serve any left-over drink the next or second day if kept suitably cool.

The objects and advantages of the invention are as follows:

First, to provide a dispenser for hot chocolate and cocoa drinks which will provide the drink in clear solution free of sedimentary matter and scum.

Second, to provide a dispenser as outlined which will prevent any scum from being dispensed and thus cause the vessel in which it is dispensed to remain clean and free of scum, and also free of any sediment.

Third, to provide a dispenser as outlined which will maintain the drink at a uniform suitably high temperature without any danger of scorching of the drink before serving.

2

Fourth, to provide a dispenser as outlined which is relatively simple in construction and operation and which is easily and conveniently cleaned.

In describing the invention reference will be had to the accompanying drawings, in which.

Figure 1:
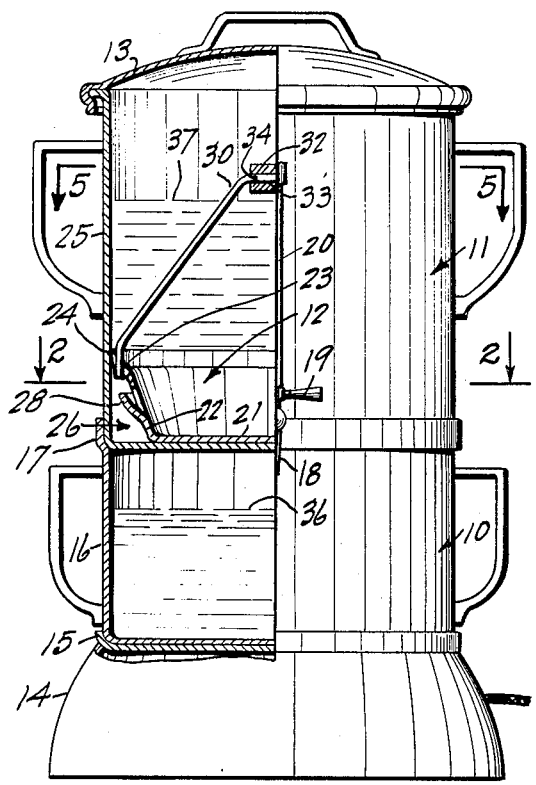
Fig. 1 is a front elevation of the invention shown half in section to show exterior and interior constructions and arrangement.

The invention includes a water container or boiler 10, a hot chocolate container 11, a settling basin and skimmer 12, a cover 13, and heating means 14 for the boiler, which in the present case is indicated as an electric hot plate, though other heating means such as gas can be employed.

The heating means is preferably provided with a peripheral wall 15 at the top to center and retain the boiler in position.

The boiler 10 has the upper end of the wall 16 offset as indicated at 17 to form a shelf and peripheral wall for supporting and centering the hot chocolate container 11, and this container is provided with the conventional dispensing faucet 18 controlled by the handle 19; and with a gauge glass 20 to indicate the level of the fluid in the container.

The settling basin and skimmer 12 has a bottom 21 and sloping side walls 22 terminating near the upper end in a shelf-like portion 23 which finally terminates in an upstanding wall 24 the upper end of which slidably cooperates with the inside of the wall 25 of the hot chocolate container, the sloping walls forming an annular dispensing chamber 26 with which the faucet has communication.

Figure 3:
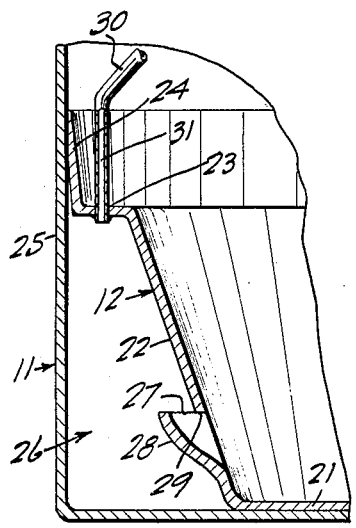
Fig. 3 is an enlarged fragmentary vertical section through the invention showing the arrangement of drink container and settling and skimming device for retaining the sedimentary material and scum.
Figure 4:
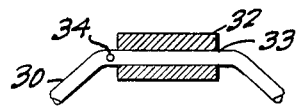
Fig. 4 is an enlarged view of the valve for trapping the air in the dispensing compartment until the sedimentary matter has settled.
Figure 2:
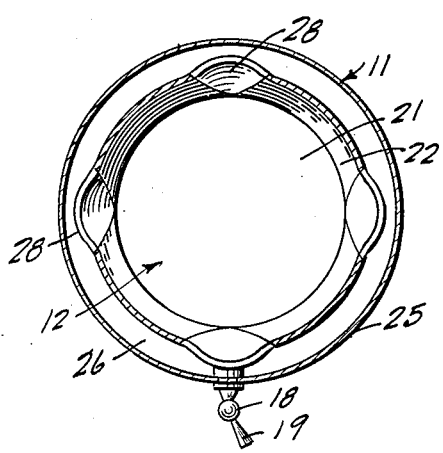
Fig. 2 is a section taken on line 2—2 of Fig. 1.

Relatively close to the bottom 21 a plurality of outlets 27 are formed, preferably as shown in Figs. 1, 2, and 3, in which the metal is slit at points about ¾ inch above the bottom and the metal formed out as illustrated at 28 so that as long as any liquid can pass from the container to the dispensing chamber, no scum can pass through, the edge 29 functioning as a skimmer when the level of the fluid gets down to that point.

As will be noted, an air trap is formed in the annular dispensing chamber because of the very close fit of the settling basin and skimmer at the upper edge, the chocolate drink will not pass through, nor will the air escape.

A bail 30 is provided for insertion and removal of the settling and skimming basin, and is simultaneously converted into a bleeder for escape of air from the annular dispensing chamber; being formed of tubular stock as indicated at 31 the ends of which are fixed in the shelf-like portion 23 and open into the annular chamber.

A handle 32 is slidable on the horizontal portion 33 of the bail and functions as handling means and as a valve in connection with the passage 34 formed at one end of the horizontal portion.

Figure 5:
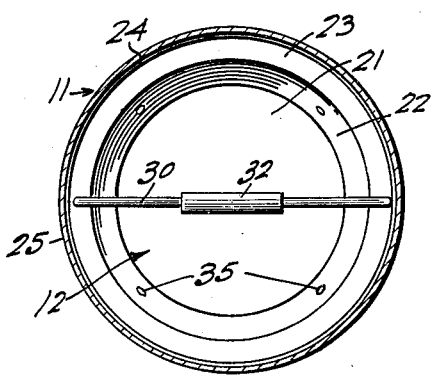
Fig. 5 is a section taken on line 5—5 of Fig. 1 with handles removed and a modified form of settler and skimmer in which holes are formed in place of the offset outlets.

As shown in Fig. 5, holes 35 may be formed in place of the offset lips 28, but they would permit scum to pass only while the level of the drink dropped from the top to the bottom of the holes and therefore is not so desirable, and some sediment could pass through, while with the preferred form no sediment can pass down the slopes and discharge to the annular chamber.

In use, the water 36 is heated to the proper temperature for suitably maintaining the heat of the hot chocolate drink 37, the drink being prepared while the water is heating.

The settling and skimming basin is lowered to the bottom of the container 11 as shown, under slight pressure because the upstanding wall 24 fits frictionally. The handle 32 is slid over the opening 34. The hot chocolate drink is poured into the container 11 and allowed to stand for a few minutes. During this period a small amount of the liquid will flow into the annular chamber, and the sediment in the total liquid will have settled to the bottom 21 of the basin. The cover 13 is then removed and the handle 32 is slid back to uncover the aperture 34, permitting the air to escape from the annular chamber 26 and permitting the chamber to fill with the settled liquid.

It will be noted that when the liquid reaches the level 29 of the lip, that no scum can pass into the settling chamber, and after all of the drink has been dispensed down to the level of the lips or of the holes, the basin can be removed and cleaned, followed by thorough cleaning of the hot chocolate container.

I claim:

1. A hot chocolate dispenser comprising; a boiler and heating means therefor, a hot chocolate container heated by said boiler, and a settling and skimming basin located at the lower end of said container and having inset walls to form an annular dispensing chamber, and openings spaced slightly above the bottom of said basin to pass settled hot chocolate into the annular dispensing chamber with the sedimentary material in the hot chocolate settling to the bottom of said basin, and a dispensing spout for said annular dispensing chamber, said settling and skimming basin having a shelf-like portion at its upper end to increase the area of the dispensing chamber and with the shelf-like portion terminating in a peripheral upstanding wall with the upper end of the wall frictionally cooperating with the inside of the wall of the hot chocolate container to form an air trap.

2. A hot chocolate dispenser comprising; a boiler and heating means therefor, a hot chocolate container heated by said boiler, and a settling and skimming basin located at the lower end of said container and having inset walls to form an annular dispensing chamber, and openings spaced slightly above the bottom of said basin to pass settled hot chocolate into the annular dispensing chamber with the sedimentary material in the hot chocolate settling to the bottom of said basin, and a dispensing spout for said annular dispensing chamber, said settling and skimming basin having inwardly and downwardly sloping side walls, and having a bail for insertion and removal at will; said settling and skimming basin having a shelf-like portion at its upper end to increase the area of the dispensing chamber and with the shelf-like portion terminating in a peripheral upstanding wall with the upper end of the wall frictionally cooperating with the inside of the wall of the hot chocolate container to form an air trap.

3. A hot chocolate dispenser comprising; a boiler and heating means therefor, a hot chocolate container heated by said boiler, and a settling and skimming basin located at the lower end of said container and having inset walls to form an annular dispensing chamber, and openings spaced slightly above the bottom of said basin to pass settled hot chocolate into the annular dispensing chamber with the sedimentary material in the hot chocolate settling to the bottom of said basin, and a dispensing spout for said annular dispensing chamber, said settling and skimming basin having inwardly and downwardly sloping side walls, and having a bail for insertion and removal at will; said openings comprising outwardly formed portions open at the top and confined to upward flow of liquid to the dispensing chamber; said settling and skimming basin having a shelf-like portion at its upper end to increase the area of the dispensing chamber and with the shelf-like portion terminating in a peripheral upstanding wall with the upper end of the wall frictionally cooperating with the inside of the wall of the hot chocolate container to form an air trap.

4. A hot chocolate dispenser comprising; a boiler and heating means therefor, a hot chocolate container heated by said boiler, and a settling and skimming basin located at the lower end of said container and having inset walls to form an annular dispensing chamber, and openings spaced slightly above the bottom of said basin to pass settled hot chocolate into the annular dispensing chamber with the sedimentary material in the hot chocolate settling to the bottom of said basin, and a dispensing spout for said annular dispensing chamber, said settling and skimming basin having inwardly and downwardly sloping side walls, and having a bail for insertion and removal at will; said settling and skimming basin having a shelf-like portion at its upper end to increase the area of the dispensing chamber and with the shelf-like portion terminating in a peripheral upstanding wall with the upper end of the wall frictionally cooperating with the inside of the wall of the hot chocolate container to form an air trap; said bail being formed of tubular material with the ends fixed in said shelf-like portion and opening into said annular dispensing chamber, and including means for locking and releasing air in said chamber at will.

5. A hot chocolate dispenser comprising; a boiler and heating means therefor, a hot chocolate container heated by said boiler, and a settling and skimming basin located at the lower end of said container and having inset walls to form an annular dispensing chamber, and openings spaced slightly above the bottom of said basin to pass settled hot chocolate into the annular dispensing chamber with the sedimentary material in the hot chocolate settling to the bottom of said basin, and a dispensing spout for said annular dispensing chamber, said settling and skimming basin having a shelf-like portion formed adjacent the upper end of its side walls; a bail formed of tubular material and having its ends fixed in said shelf-like portion and opening into said annular dispensing chamber, and including means for locking and releasing air in said chamber at will, and comprising a horizontal portion at the top center of said bail and having a handle slidable thereon to two positions, and a passage formed at one end of said horizontal portion and closable and openable at will by sliding said handle from one position to another.

6. A hot chocolate dispenser comprising a hot chocolate container having side walls and a bottom, a settling and skimming basin having a bottom and side walls with the upper ends of the side walls slidably fitting in said container and with the side walls inset below the upper ends to form an annular dispensing chamber between the side walls of the container and of the basin, and having a plurality of openings formed through the side walls of the basin intermediate the height thereof for passage of liquid to the annular dispensing chamber and forming a settling basin below said openings for sedimentary material in the liquid, said basin having outwardly and upwardly sloping side walls terminating at the upper end in an annular flat portion terminating in an upstanding outwardly divergent peripheral wall to frictionally engage the inside of the wall of said hot chocolate container, with the annular flat portion and sloping walls providing ample volume between the side walls of the container and basin for the dispensing chamber; said openings comprising recesses formed outwardly from the side walls of the basin intermediate the height thereof and provided with openings at the top confined to upward flow of liquid to the dispensing chamber, and with the edges of the openings parallel to form skimming means, to retain scum against passage to the dispensing chamber.

7. A hot chocolate dispenser comprising a hot chocolate container having side walls and a bottom, a settling and skimming basin having a bottom and side walls with the upper ends of the side walls slidably fitting in said container and with the side walls inset below the upper ends to form an annular dispensing chamber between the side walls of the container and of the basin, and having a plurality of openings formed through the side walls of the basin intermediate the height thereof for passage of liquid to the annular dispensing chamber and forming a settling basin below said openings for sedimentary material in the liquid, a bail for said basin and having an air passage formed therein and communicating with said annular dispensing chamber, an air discharge passage in communication with said air passage, and said bail being fixed to said basin, and means for opening and closing said air discharge passage at will to release or lock entrapped air in said annular dispensing chamber.

ALEXANDER F. LUNARDI.

REFERENCES CITED

The following references are of record in the file of this patent:

UNITED STATES PATENTS

| Number | Name | Date |
|---|---|---|
| 1,636,866 | Kutzer | July 26, 1927 |
| 1,658,560 | Kellogg | Feb. 7, 1928 |
| 1,910,186 | Sisk | May 23, 1933 |
| 1,995,829 | Wise | Mar. 26, 1935 |
| 2,287,156 | White | June 23, 1942 |
| 2,288,240 | Herman | June 30, 1942 |
| 2,421,375 | Elliott | June 3, 1947 |

FOREIGN PATENTS

| Number | Country | Date |
|---|---|---|
| 68,050 | Switzerland | Mar. 18, 1914 |